May 26, 1970
R. S. WIENER
3,514,255
PRODUCTION OF GRANULAR DIAMMONIUM PHOSPHATE
Original Filed Sept. 16, 1966
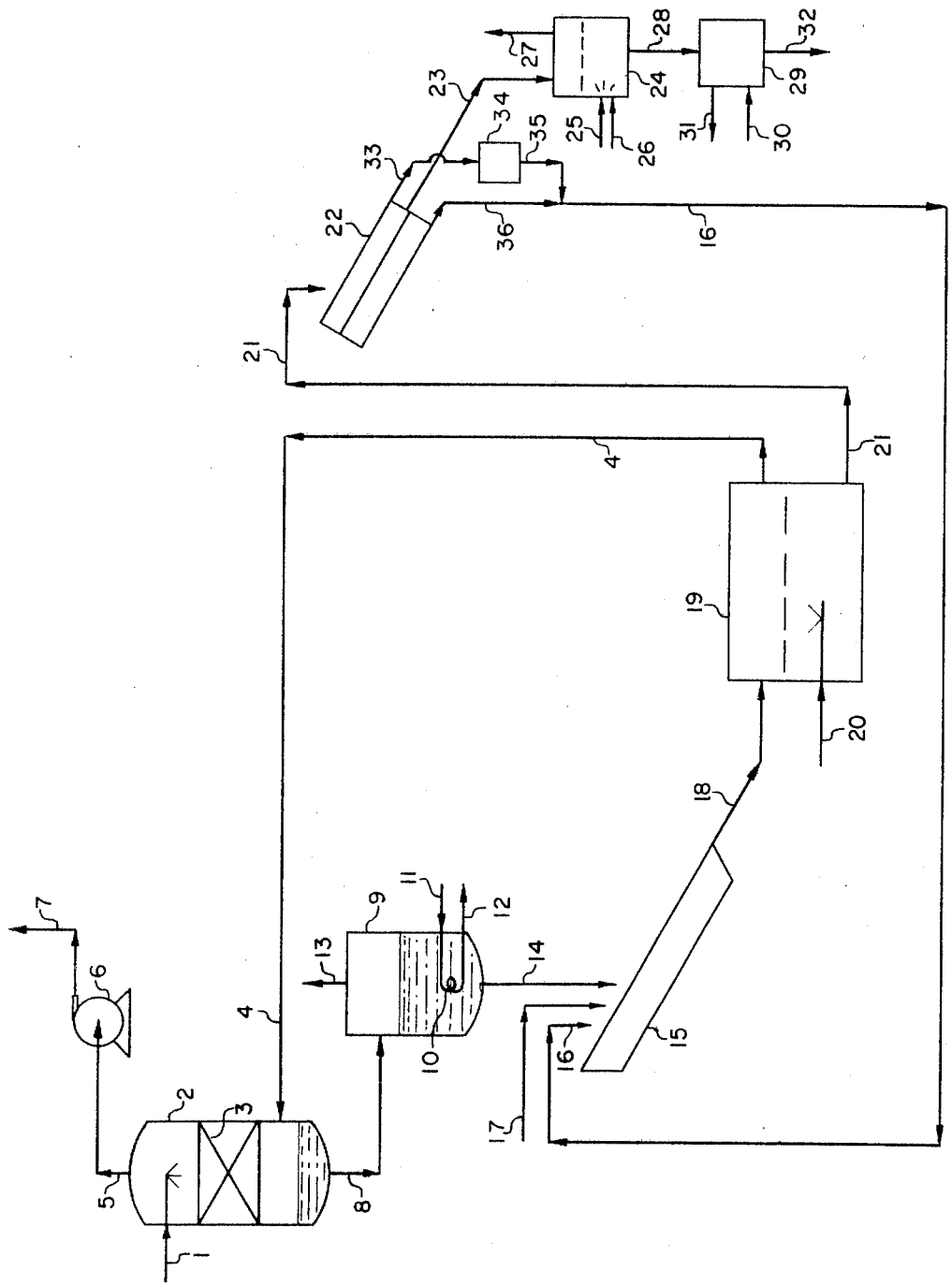
RICHARD S. WIENER
*INVENTOR.*
BY *J. T. Chabot*
AGENT United States Patent Office 3,514,255
Patented May 26, 1970

3,514,255
PRODUCTION OF GRANULAR DIAMMONIUM PHOSPHATE
Richard S. Wiener, Stamford, Conn., assignor to Chemical Construction Corporation, New York, N.Y., a corporation of Delaware
Continuation of application Ser. No. 580,082, Sept. 16, 1966. This application Apr. 30, 1969, Ser. No. 820,682
Int. Cl. C01b 25/28; C05b 11/00
U.S. Cl. 23—106                                5 Claims

ABSTRACT OF THE DISCLOSURE

Ammonium phosphate fertilizer is produced by mixing phosphoric acid with a recycled stream of acid-free solid diammonium phosphate fines, derived as a component of the product stream. All of the resulting acid-wetted solid granules are ammoniated with an ammonia feed stream, to evolve water vapor and produce granules of solid diammonium phosphate of low water content. The granules are screened to separate acid-free diammonium phosphate fines from the product diammonium phosphate granules, and the fines are recycled for mixing with further phosphoric acid.

---

This application is a combination of Ser. No. 580,082, filed Sept. 16, 1966, now abandoned.

The present invention relates to the production of granular diammonium phosphate from phosphoric acid and ammonia. An improved processing sequence is provided, in which recycled solid diammonium phosphate fines are initially reacted with the phosphoric acid feed stream, to produce an intermediate solid granular stream which is subsequently separately ammoniated. This procedure permits the usage of concentrated phosphoric acid in the process, and improved drying is attained during ammoniation, which permits the direct production of dry diammonium phosphate suitable for screening and direct product utilization. Thus, the prior art solids dryer is eliminated and in addition solids recycle requirement is substantially reduced. Both capital cost savings and operating cost savings are attained.

Although the production of diammonium phosphate involves a relatively simple chemical reaction between ammonia and phosphoric acid, usually in the presence of recycled solid material, the technology is highly advanced and numerous patents including U.S. Pats. Nos. 3,005,696; 2,963,359; 2,980,526; 2,976,125; 2,946,655; 2,891,856; 2,799,569 and 2,792,286 provide improvements of the basic process technology. The manufacture of ammonium phosphate granules is normally carried out by neutralizing phosphoric acid with ammonia, mixing the resulting slurry with recycled product, and granulating the mixture. An early process of this type consisted of two or more neutralization tanks in which phosphoric acid and, at times, sulfuric acid were neutralized in stages with anhydrous ammonia. Neutralization was carried out either to the monoammonium phosphate step or further on to diammonium phosphate, depending upon the desired product. The final neutralized mixture was a hot viscous slurry of ammonium phosphate crystals in a saturated solution of ammonium phosphate. This slurry then either flowed by gravity or was pumped into a granulating device called a "blunger," which was basically a two-shaft pugmill. Also added to the blunger was a large quantity of recirculated fine product. The slurry and fines were mixed thoroughly in the blunger and damp granules of product were formed. The granules, containing 3% to 4% moisture, discharged from the blunger through a chute into a rotary dryer. The granules were then dried, and screened. Fines and crushed oversize were recycled to the blunger.

The operation of the blunger was the most important part of this process, and careful control of moisture and other operating conditions was required. Two conditions in particular had to be controlled carefully. One was the moisture in the slurry from the neutralization tanks. Unless a minimum moisture was maintained, the slurry would become very viscous and could not be transferred to the blunger. On the other hand, the moisture in the blunger would have to be controlled below a certain point to prevent overgranulation and sticking of fertilizer to the blunger. Therefore, to maintain a flowable slurry required that a rather large amount of moisture be introduced into the blunger with the slurry and then, to reduce the percentage moisture in the blunger to a proper value, a large amount of recycled product on the order of 10 to 15 times the production rate would have to be added. Although this process was quite effective and produced an excellent product, the requirement of such a large amount of recycle was a severe disadvantage.

The Tennessee Valley Authority (TVA) process, portions of which are disclosed in patents cited supra, was developed to overcome the disadvantage of excessive recycle. The blunger was replaced by a rotary ammoniator-granulator which was a horizontal rotating drum in which both ammoniation and granulation took place. The prior art blunger was replaced since this unit was not readily suitable for ammoniation. The advantage of the ammoniator-granulator was that a partially ammoniated slurry with a minimum moisture content could be introduced into the granulator, additional water would be driven off by the heat of the final ammoniation reaction, and the amount of recycle required would therefore be much less than that of the blunger process. The recycle ratio in the TVA process was reduced to about the order of 4 or 5 to 1. The balance of the process remained almost the same as the blunger process except for the requirement of a single neutralizer tank instead of several such tanks. The TVA process led to lower capital and operating costs.

Both the blunger and the TVA processes have the disadvantage that a large amount of material must be passed through a dryer to reduce the moisture to the required level. In both processes the granulator discharge contains about 3% to 4% moisture, and the granules must normally be separately dried to about 1% moisture, to prevent sticking on the screens and other equipment, and also for product requirements. In the blunger process about 11 tons must be dried for every ton of product produced, and in the TVA process about 5 tons must be dried per ton of product produced. The dryers are expensive and require a large amount of space. Auxiliary equipment required for the handling of the dust-laden air leaving the dryer includes cyclones, scrubbers, fans and stacks. The elimination of this large dryer or at least the use of a smaller dryer for product drying alone would present substantial economic advantages compared to the blunger or the TVA processes.

In the present invention, recycled solid diammonium prosphate fines are initially reacted with the phosphoric acid feed stream, to produce an intermediate solid granular stream which is substantially ammoniated by reaction with the ammonia feed stream in a separate step. This sequence permits the utilization of concentrated phosphoric acid in the process, and improved and greater drying is obtained during ammoniation, which permits the direct production of dry diammonium phosphate from the ammoniation step, which is directly suitable for screening and production of dry commercial specification product.

In the process of the present invention, phosphoric acid is sprayed onto a bed of recycled fines in a granulating device such as a pan granulator. The phosphoric acid reacts with the recycled diammonium phosphate fines producing a material having a contained nitrogen/phosphorus (N/P) mole ratio of about 1.4 to 1.7, which compares with an N/P mole ratio of about 1.9 or higher in the granular diammonium phosphate product and recycle fines. The action of the granulator promotes the formation of larger granules. The wetted or damp solid granules drop by chute into the ammoniation drum, which is a large revolving drum equipped with an ammonia sparger. Anhydrous ammonia is fed into the drum and reacts with the partially ammoniated material, thus raising the N/P mole ratio to about 1.9. The heat of reaction drives off a considerable amount of moisture and the granules discharge from the ammoniator containing about 1% or less of moisture. This material is directly suitable for screening without preliminary drying, and is screened to separate fines and oversize from product granular diammonium phosphate. The oversize material is crushed, and is then recycled with the fines to the granulator. Unreacted ammonia vapor in the water vapor stream discharged from the ammoniator is absorbed in a scrubber using the feed phosphoric acid as a scrubbing agent.

The process of the present invention possesses several important advantages. Concentrated phosphoric acid may be employed in the process, since the pan granulator produces solid granules and the aqueous liquid phase required in the prior art for the formation of a slurry is no longer needed. An important advantage is that the ammoniation step produces substantially dry granules containing 1% or less of moisture content and directly suitable for screening, and consequently the large and expensive dryers and dryer appurtenances of the prior art processes are eliminated. In addition, the prior art processes required one or several neutralizer tanks for the liquid phase reaction of ammonia with phosphoric acid, which are not required in the procedure of the present invention.

It is an object of the present invention to produce granular diammonium phosphate from ammonia phosphoric acid in an improved manner.

Another object is to produce granular diammonium phosphate using concentrated phosphoric acid, thereby reducing water input to the process.

A further object is to directly produce granular diammonium phosphate of reduced water content by ammoniation of a mixture of recycled fines and phosphoric acid.

An additional object is to produce granular diammonium phosphate by reaction between ammonia, phosphoric acid and recycled fines which is directly suitable for screening without preliminary drying.

Still another object is to produce granular diammonium phosphate by granulating recycled diammonium phosphate fines with phosphoric acid, and ammoniating the granular product.

Still a further object is to eliminate liquid phase or slurry processing in the production of granular diammonium phosphate from ammonia and phosphoric acid.

These and other objects and advantages of th present invention will become evident from the description which follows. Referring to the figure, which is a flow sheet of a preferred embodiment of the present invention, phosphoric acid feed stream 1 is admitted into vapor scrubber 2 above packed section 3. Stream 1 consists of aqueous liquid phosphoric acid solution, and usually consists of concentrated phosphoric acid having more than 30% equivalent phosphorus pentoxide content by weight. Equivalent phosphorus pentoxide content is a measurue of concentration which measures phosphoric acid concentration in terms of contained phosphorus content if totally converted to phosphorus pentoxide. Stream 1 may also consist of dilute phosphoric acid in some instances. Stream 1 flows downwards through section 3 and scrubs vapor stream 4, derived in a manner to be described infra, and thereby recovers and absorbs ammonia vapor into the liquid phase. The residual vapor phase above section 3, now consisting primarily of water vapor, is removed via stream 5 by fan 6 and discharged to atmosphere via stream 7 through a stack, not shown.

Returning to unit 2, the liquid phosphoric acid containing dissolved ammonia values is removed via stream 8 and passed to evaporator-concentrator 9, in which the liquid solution is heated by coil 10, which is provided with heating steam via stream 11, with condensate removal via stream 12. The liquid solution in unit 9 is heated and concentrated in unit 9, and evolved water vapor is discharged via stream 13. The resulting concentrated phosphoric acid solution, usually of a strength of at least 30% equivalent phosphorus pentoxide content by weight, is now passed from unit 9 via stream 14 into inclined pan granulator 15. Stream 16, consisting of recycled diammonium phosphate fines and derived in a manner to be described infra, is also passed into unit 15. In suitable instances, optional stream 17 consisting of potash, ammonium nitrate, urea, potassium nitrate, superphopshate or trace elements, may also be passed into unit 15. Stream 14 is sprayed onto a bed of solid material consisting of stream 16 or streams 16 and 17 in unit 15, and the phosphoric acid stream 14 reacts with the diammonium phosphate fines stream 16 to produce a material having a contained nitrogen/phosphorus mole ratio of below 1.9 and typically in the range of 1.4 to 1.7. The temperature of the reacting mixture in unit 15 is typically in the range of 30° C. to 90° C., and the action of the granulator unit 15 promotes the formation of large granules which are wetted by stream 14.

The damp granules produced by unit 15 are discharged and dropped by chute via stream 18 into ammoniator 19, which is typically a large cylindrical drum which revolves around its horizontal axis and is equipped with an ammonia sparger, not shown. Ammonia stream 20 is also passed into unit 19 and reacts with stream 18, providing an ammoniating effect which serves to raise the contained nitrogen/phosphorus mole ratio of the solid granules phase to about 1.9 or higher. Stream 20 usually consists of substantially anhydrous ammonia, which may be either in the liquid or vaporized state, however stream 20 may also consist of conventional aqueous ammonia. Due to the exothermic nature of the reaction in unit 19, the heat of reaction generates a temperature typically in the range of 50° C. to 120° C. and drives off a considerable amount of moisture from the granules. The evolved water vapor, which usually contains a minor proportion of unabsorbed ammonia vapor, is removed from unit 19 via stream 4, which is processed for recovery of ammonia values as described supra.

The dried solid granules discharged from ammoniator 19 via stream 21 contain about 1% or less of moisture, and are directly suitable for screening without intermediate drying. Stream 21 is now passed to screening apparatus 22, which is a conventional unit provided with screens having varying mesh sizes for separation of solids based on particle size. Solid material of desired product specification particle size is removed from unit 22 via stream 23, which may now be further dried in a small dryer in suitable instances. Stream 23 may be directly passed to product utilization in most cases, however further drying may be provided for long-term product storage. The solid material stream 23 is passed into dryer 24, which is a small conventional unit in which fluid hydrocarbon stream 25 is burned with air stream 26 to generate a hot gas stream which contacts the solid material and provides a drying effect. Flue gas containing evolved water vapor is discharged from unit 24 via stream 27. The hot dried solid diammonium phosphate granules from stream 28 discharged from unit 24 is now cooled in cooler 29, usually by contact with ambient air admitted via stream 30 with removal of warmed air via stream 31. Product diammonium phosphate granules are passed from unit 29 via stream 32 to product utilization.

Returning to unit 22, oversize solid particles stream 33 is discharged into crusher 34 and is crushed or pulverized. The resulting crushed solids stream 35 is combined with solid undersize or fines material stream 36, which is also discharged from unit 22, to form stream 16. The combined fines material stream 16, consisting of small particles of solid diammonium phosphate, is recycled as described supra.

Numerous alternatives within the scope of the present invention will occur to those skilled in the art. Thus, the ranges of process variables such as temperature enumerated supra constitute preferred embodiments for optimum utilization of the process concepts of the present invention, and the invention may also be practiced outside of these ranges in practice, except that in most instances, such as when stream 17 is omitted, stream 18 will have a contained nitrogen/phosphorus mole ratio below 1.9, and stream 21 will have a contained nitrogen/phosphorus mole ratio of about 1.9 or higher and will consist essentially of diammonium phosphate containing, at most, only minor residual proportions of monoammonium phosphate.

Stream 1 may consist of highly concentrated phosphoric acid, in which case unit 9 and its function may be omitted. Stream 1 may consist of wet process phosphoric acid, derived from the digestion of phosphate rock with sulfuric acid; or furnace acid, derived by the reduction of phosphate rock to phosphorus in an electric furnace with subsequent oxidation of the phosphorus or phosphorus pentoxide, which is then absorbed in water or an aqueous solution to yield furnace acid. In some instances, stream 1 may be sprayed directly into unit 15 and onto stream 16 and optional stream 17. In this case, units 2 and 9 will be omitted, and the ammonia values in stream 4 may be recovered by other suitable means such as by cooling and condensation, or by scrubbing stream 4 with nitric acid or sulfuric acid to produce the respective ammonium salt. In some instances, substantially all of the ammonia in stream 20 will be transferred to stream 21 in unit 19, and stream 4 will be essentially devoid of ammonia vapor. In this case, stream 4 may be directly discharged to the atmosphere and unit 2 will be omitted, with stream 1 passing directly either to unit 9 or to unit 15. In some instances, stream 1 will consist of somewhat dilute phosphoric acid, which is passed into unit 2 at a reduced flow rate. In this case, additional concentrated phosphoric acid may be added to stream 14 or separately sprayed or otherwise dispersed into unit 15.

Stream 33 and unit 34 may be omitted in some instances, as when product specifications do not place an upper limit on particle size. In this case, only a fines stream 36 will be separated from stream 21 and recycled via stream 16. In some cases, it may be desirable to recycle a portion of stream 23, by adding the portion to stream 33 for recycle via unit 34 and streams 35 and 16. When stream 23 is sufficiently dry to meet product specifications, unit 24 will be omitted and stream 23 will be passed directly to product utilization or stream 23 may be cooled in a solids cooler such as unit 29 before final utilization.

Numerous alternatives with respect to the apparatus employed in the process of the present invention will occur to those skilled in the art. Thus, in some instances the packed section 3 may be omitted, in which case unit 2 would be a simple spray tower. In other cases, unit 2 could consist of a Venturi-type scrubber. Section 3 may be provided with any suitable type of packing bed, such as spheres, rings or saddles, or section 3 may be replaced in suitable instances by other gas-liquid contact means such as sieve trays or bubble cap plates. Unit 9 may be a vacuum evaporator in some instances, in which case stream 13 would extend to a suitable source of vacuum such as a steam jet exhauster. Unit 15 is preferably a pan granulator, however other types of granulators known to the art may be employed to carry out the function of unit 15. Unit 19 is preferably a rotating cylindrical horizontally oriented ammoniator, however other types of devices for carrying out the ammoniation function may be employed as unit 19.

An example of an industrial application of the process of the present invention will now be described.

EXAMPLE

The process of the present invention was applied in the design of a commercial facility with an output of 10 tons per hour of product granular diammonium phosphate. Concentrated phosphoric acid was employed in the process, and consequently unit 9 was omitted. In addition, 0.9 ton per hour of water vapor was evolved and discharged from the pan granulator unit 15.

Following is data relative to the contents of the major process streams.

| | Equivalent content, tons per hour | | | | Mole ratio contained nitrogen to phosphorus |
|---|---|---|---|---|---|
| Stream No. | Ammonia [1] | Phosphorus pent oxide [2] | Water | Percent water by weight | |
| 1 | | 4.7 | 3.6 | | |
| 4 | 0.5 | | 2.6 | | |
| 5 | | | 2.6 | 100 | |
| 14 | 0.5 | 4.7 | 3.6 | | 0.4 |
| 16 | 9.0 | 19.3 | 0.4 | | |
| 18 | 9.5 | 24.0 | 3.1 | 6.0 | 1.65 |
| 20 | 2.2 | | | | |
| 21 | 11.2 | 24.0 | 0.5 | 1.0 | 1.94 |
| 23 | 2.2 | 4.7 | 0.1 | 1.0 | 1.94 |

[1] Assuming that all contained nitrogen is present as equivalent ammonia.
[2] Assuming that all contained phosphorus is present as equivalent phosphorus pentoxide.

I claim:
1. In a process for the production of solid diammonium phosphate in which feed streams of phosphoric acid and ammonia, and a recycled diammonium phosphate stream, are reacted to produce a stream of solid granular diammonium phosphate particles, the improvement which comprises
  (a) screening said stream of solid granular diammonium phosphate particles, to separate a stream of solid fines essentially consisting of diammonium phosphate from product granular diammonium phosphate,
  (b) recycling said stream of solid fines from (a) to a granulator and mixing said solid fines stream essentially consisting of diammonium phosphate with said phosphoric acid feed stream in said granulator at a temperature in the range of 30° C. to 90° C., whereby a plurality of acid-wetted solid granules is produced having a contained nitrogen/phosphorus mole ratio in the range of 1.4 to 1.7,
  (c) contacting all of the acid-wetted solid granules produced by step (b) with said ammonia feed stream at a temperature in the range of 50° C. to 120° C., whereby said granules are ammoniated by reaction with ammonia to produce said stream of solid granular diammonium phosphate particles with a contained nitrogen/phosphorus mole ratio of at least about 1.9, thereby also evolving a stream of water vapor and drying said granules and
  (d) passing said solid granular diammonium phosphate particles produced by step (c) to step (a).

2. The process of claim 1, in which said stream of water vapor evolved by step (c) contains unabsorbed ammonia vapor, and said evolved water vapor stream is scrubbed with said phosphoric acid feed stream, prior to passing said phosphoric acid feed stream to step (b).

3. The process of claim 2, in which said phosphoric acid feed stream containing dissolved ammonia and produced by scrubbing said evolved water vapor is concentrated by evaporation of water, prior to passing said phosphoric acid feed stream to step (b).

4. The process of claim 1, in which said phosphoric acid feed stream is a concentrated acid containing more than 30% equivalent phosphorus pentoxide content by weight.

5. The process of claim 1, in which the screening of solid granular diammonium phosphate particles in step (a) also separates a portion consisting of oversize granules, and said oversize granules are crushed and recycled to step (b) together with said separated fines essentially consisting of diammonium phosphate.

References Cited

UNITED STATES PATENTS

| | | | |
|---|---|---|---|
| 3,053,622 | 9/1962 | Bostwick. | |
| 3,249,421 | 4/1966 | Bigot et al. | 71—43 |
| 3,306,729 | 2/1967 | McPherson et al. | 71—43 |
| 3,382,059 | 5/1968 | Getsinger | 71—43 |

REUBEN FRIEDMAN, Primary Examiner

C. N. HART, Assistant Examiner

U.S. Cl. X.R.

71—43, 64